UNITED STATES PATENT OFFICE.

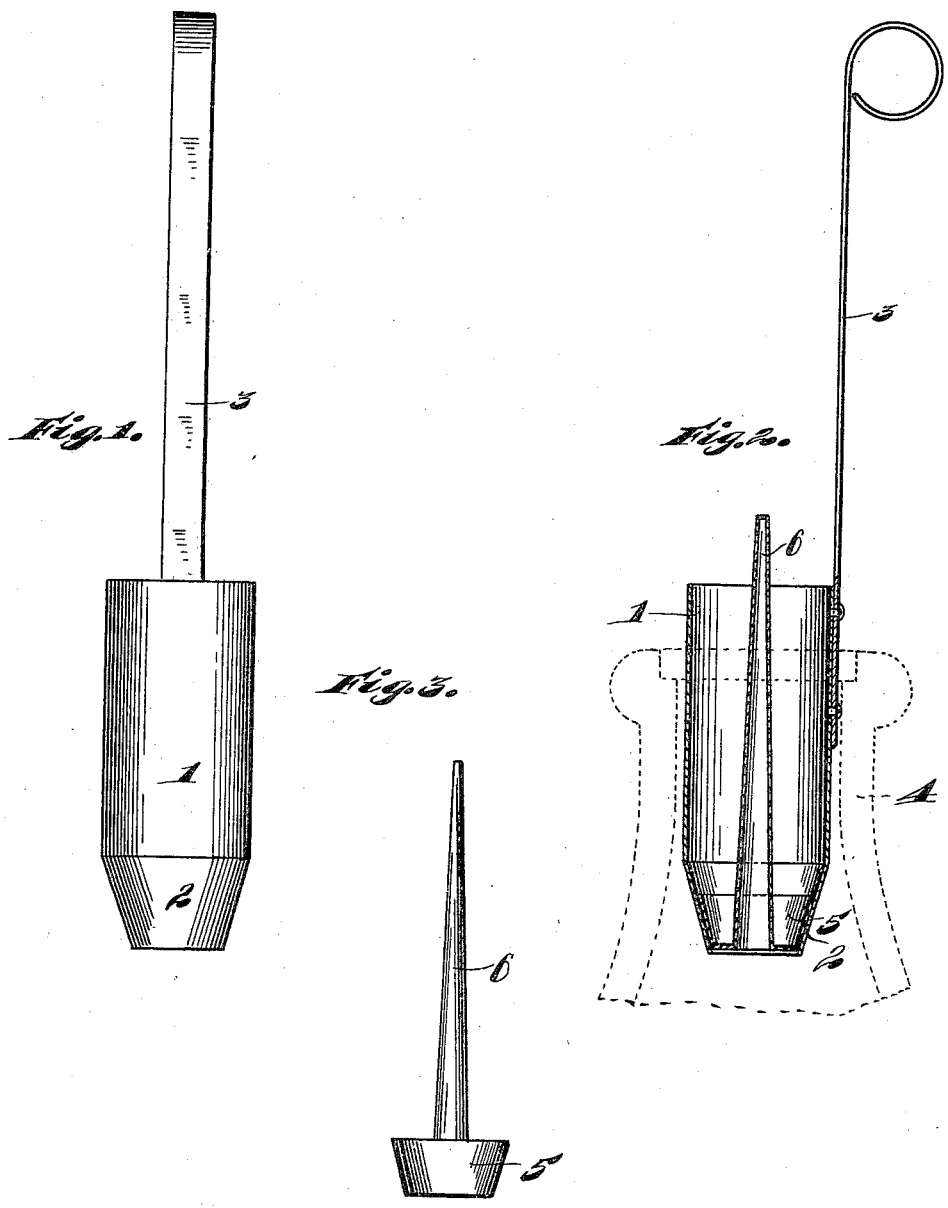

DAVID E. HUBBELL, OF ELGIN, ILLINOIS.

MILK-SKIMMER.

1,142,041.    Specification of Letters Patent.    Patented June 8, 1915.

Application filed August 6, 1913. Serial No. 783,284.

*To all whom it may concern:*

Be it known that I, DAVID E. HUBBELL, a citizen of the United States, and a resident of the city of Elgin, county of Kane, and State of Illinois, have invented certain new and useful Improvements in Milk-Skimmers, of which the following is a specification.

My invention relates to improvements in milk skimmers and has for its object the provision of a simple and efficient skimmer for removing the cream from milk bottles.

The invention consists in the combinations and arrangements of parts hereinafter described and claimed.

The invention will be best understood by reference to the accompanying drawing forming a part of this specification, and in which—

Figure 1 is an elevation of a skimmer embodying my invention, Fig. 2, a vertical section thereof shown in position for use, and Fig. 3, an elevation of a closure employed in the construction.

The preferred form of construction as illustrated in the drawing comprises a tubular member 1 consisting of a sheet metal sleeve open at both ends and having its lower end 2 inwardly tapering as shown. Member 1 is provided with an upwardly extending handle 3 secured to one side thereof and adapted to facilitate the insertion of said member in the neck of a milk bottle 4 as indicated in Fig. 2. The closure 5 which is in the form of a frusto conical cup is tapered to fit the lower end 2 of member 1. This closure is adapted to be used independently of the member 1, when desired, and is of sufficient size to hold an appreciable amount of fluid. Closure 5 is provided with an upwardly extending hollow handle 6 secured centrally thereto and open at the bottom as shown. It will be observed that the handle 6 is upwardly tapering in form so that the requisite strength is provided at the connection between the handle and the closure and at the same time the least possible space occupied within the tubular member 1.

In use the closure 5 is first removed from member 1 and said member inserted in the neck of the bottle until the lower end thereof reaches the lower end of the strata of cream collected on the top of the milk. Then closure 5 is inserted in member 1 and the lower end of said member closed thereby thus imprisoning the cream in said member, whereupon the cream may be removed by simply lifting the member out of the bottle.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A milk skimmer consisting of two separable parts, one part comprising a tubular member adapted to be inserted in the neck of a bottle and open at both ends, the lower end of said member being inwardly tapered, the second part being a cup shaped closure of sufficient size to hold an appreciable quantity of fluid, adapted to be inserted in said tubular member and comprising a flat circular bottom and side walls tapered to fit the lower portion of said tubular member and an upwardly extending handle on each of said parts, substantially as described.

In testimony whereof I have signed my name to this specification in the presence of two subscribing witnesses.

DAVID E. HUBBELL.

Witnesses:
 A. L. PAULSON,
 G. L. PAULSON.